United States Patent [19]

Inoue et al.

[11] Patent Number: 5,801,802
[45] Date of Patent: Sep. 1, 1998

[54] LIQUID CRYSTAL DISPLAY PANEL WITH TWO ALIGNMENT DOMAINS

[75] Inventors: Hiroyasu Inoue; Minoru Otani; Tadashi Hasegawa, all of Kawasaki, Japan

[73] Assignee: Fujitsu Limited, Kawasaki, Japan

[21] Appl. No.: 716,558

[22] Filed: Sep. 9, 1996

[30] Foreign Application Priority Data

Dec. 8, 1995 [JP] Japan ..................... 7-320590
Jul. 8, 1996 [JP] Japan ..................... 8-178187

[51] Int. Cl.$^6$ ............................. G02F 1/1337
[52] U.S. Cl. ............................. 349/129; 349/128
[58] Field of Search ...................... 349/128, 129

[56] References Cited

U.S. PATENT DOCUMENTS

| | | | |
|---|---|---|---|
| 5,280,375 | 1/1994 | Tsuda et al. | 349/128 |
| 5,473,455 | 12/1995 | Koike et al. | 349/124 |
| 5,648,828 | 7/1997 | Sakamoto et al. | 349/129 |
| 5,648,829 | 7/1997 | Yano | 349/129 |

FOREIGN PATENT DOCUMENTS 08-122787  5/1996  Japan .

*Primary Examiner*—Anita Pellman Gross
*Attorney, Agent, or Firm*—Greer, Burns & Crain, Ltd.

[57] ABSTRACT

First and second substrates are disposed facing each other. Drive wiring lines including signal and control lines are formed on the first substrate on the side facing the second substrate. A pixel electrode is formed on the first substrate in the pixel region and on the side facing the second substrate. A switching element is provided for each pixel electrode. A common electrode is formed on the second substrate on the side facing the first substrate. A liquid crystal layer is sandwiched between the first and second substrates. An alignment film is formed on one of the first and second substrates on the side facing the other substrate. A pre-tilt angle is imparted so that the ends of each liquid crystal molecule in the central region of the liquid crystal layer near the drive wiring line tilt away from the drive wiring line when a voltage is applied across each pixel electrode and the common electrode.

12 Claims, 8 Drawing Sheets

5,801,802

LIQUID CRYSTAL DISPLAY PANEL WITH TWO ALIGNMENT DOMAINS

BACKGROUND OF THE INVENTION a) Field of the Invention

The present invention relates to a liquid crystal display panel and its manufacture, and more particularly to a liquid crystal display panel and its manufacture, each pixel being divided into a plurality of regions with different pre-tilt angles.

b) Description of the Related Art

In order to improve the visual angle characteristics of a liquid crystal display panel, orientation division techniques have been proposed in which a plurality of regions having different pre-tilt angles are formed in one pixel. In a liquid crystal panel having a plurality of divided regions with different orientations, liquid crystal molecules in each pixel do not rise or tilt in one direction but tilt differently at each divided region. Since the liquid crystal molecules tilt in different directions, the visual angle characteristics can be improved.

It is not easy to form a plurality of regions having different pre-tilt angles in one pixel. If the liquid crystal display panel has a large screen size, it is difficult to stably control pre-tilt angles over the whole area of the panel.

Unstable pre-tilt angles may cause a reverse twist phenomenon, with the twist direction of liquid crystal molecules being opposite to the expected direction or a reverse tilt phenomenon with the tilt direction of liquid crystal molecules being opposite to an expected direction.

SUMMARY OF THE INVENTION

It is an object of the present invention to provide a liquid crystal display panel and its manufacture does not suffer from the aforementioned reverse tilt and twist phenomena.

According to one aspect of the present invention, there is provided a liquid crystal display panel comprising: first and second substrates disposed facing each other with a gap interposed therebetween; drive wiring lines formed on the first substrate on the side facing the second substrate, the drive wiring lines including a plurality of signal lines disposed in a stripe shape and a plurality of control lines disposed in a stripe shape and crossing the signal lines, the drive wiring lines defining a plurality of pixel regions each defined by two adjacent signal lines and two adjacent control lines; a pixel electrode formed on the first substrate in the pixel region and on the side facing the second substrate; a switching element formed for the pixel electrode, the switching element interconnecting the corresponding pixel element and one of the adjacent two signal lines and being controlled by one of the adjacent two control lines; a common electrode formed on the second substrate on the side facing the first substrate; a liquid crystal layer sandwiched between the first and second substrates; and an alignment film formed at least on one of the first and second substrates on the side facing the other substrate, the alignment film giving liquid crystal molecules a pre-tilt so that the liquid crystal molecules at the central region in the depth direction of the liquid crystal layer tilt, moving the ends of the liquid crystal molecules on the side of the drive wiring lines away from the drive wiring lines when a voltage is applied between the pixel electrode and the common electrode.

A lateral electric field generated between the drive wiring line and pixel electrode makes liquid crystal molecules near at the end of the pixel electrode tilt in the direction of raising the ends of the molecules near to the drive wiring line. As an electric field is applied to the liquid crystal layer, the liquid crystal molecules tilt in the direction of moving the ends of the molecules near to the drive wiring line away from the drive wiring line. Namely, the tilt direction of liquid crystal molecules coincides with the tilt direction to be caused by the lateral electric field when a voltage is applied. Therefore, the reverse tilt phenomenon can be prevented.

The alignment film may include a first substrate side alignment film formed on the first substrate on the side facing the second substrate and a second substrate side alignment film formed on the second substrate on the side facing the first substrate, each of the pixel regions of the first and second substrate side alignment films may be divided at least into first and second domains, the first and second domains of one pixel region being respectively juxtaposed with the second and first domains of other pixel regions adjacent to the one pixel region over the drive wiring lines, the first substrate side alignment film gives the liquid crystal molecules in the first domain a first pre-tilt angle rising the ends of the liquid crystal molecules on the side of the drive wiring line, and gives the liquid crystal molecules in the second domain a second pre-tilt angle rising the ends of the liquid crystal molecules on the side opposite to the drive wiring line, the second pre-tilt angle being smaller than the first pre-tilt angle, and the second substrate side alignment film gives the liquid crystal molecules in the first domain a third pre-tilt angle smaller than the first pre-tilt angle, and gives the liquid crystal molecules in the second domain a fourth pre-tilt angle larger than the second pre-tilt angle for rising the ends of the liquid crystal molecules on the side opposite to the drive wiring line.

The liquid crystal molecules in the first domain tilt in the pre-tilt direction regulated by the first substrate side alignment film, and the liquid crystal molecules in the second domain tilt in the pre-tilt direction regulated by the second substrate side alignment film. Therefore, the liquid crystal molecules in the first and second domains tilt in the direction of moving the ends of the molecules on the drive wiring line side away from the drive wiring line.

A boundary line between the first and second domains in each said pixel region may be set along one diagonal of the pixel region.

The easy axes of the first and second domains of the pixel region may be the same, and a boundary line between the first and second domains may be a curve interconnecting two opposing corners of the pixel region, the curve near said two opposing corners being disposed between a diagonal interconnecting the two opposing corners and one of two drive wiring lines crossing at the two opposing corners and having a smaller angle relative to the easy axis.

The more the director of liquid crystal molecules becomes parallel to the direction of the lateral electric field, the more likely the influence of the lateral electric field becomes great. The boundary line of domains is set remote from the drive wiring line which generates the lateral electric field greatly influencing the orientation of liquid crystal molecules. Therefore, liquid crystal molecules on the boundary are hard to be influenced by the lateral electric field.

The switching element may be disposed in the first domain.

Since the switching element is disposed in the large pre-tilt region on the TFT substrate side, the liquid crystal molecules in the large pre-tilt region are hard to be influenced by a disturbance of an electric field. Therefore, the influence by a disturbance of an electric field near at TFT can be mitigated.

According to another aspect of the present invention, there is provided a method of manufacturing a liquid crystal display panel comprising the steps of: forming, on a substrate, drive wiring lines in a lattice pattern, and a pixel electrode and a switching element at each lattice point; forming an alignment film having two kinds of surfaces for giving liquid crystal molecules different pre-tilt angles for each pixel on the substrate, the alignment film giving liquid crystal molecules near at the drive wiring line pre-tilt angles different at each of both sides of the drive wiring line; and rubbing the surface of the alignment film in the direction from a larger pre-tilt angle region to a smaller pre-tilt angle region when passing over the drive wiring line.

The alignment film is rubbed from a large pre-tilt region to a small pre-tilt region when passing over the drive wiring line. Therefore, the liquid crystal molecules in the large pre-tilt region pre-tilt in the direction of rising the ends of the molecules on the drive wiring line side, and the liquid crystal molecules in the small pre-tilt region pre-tilt in the direction of rising the ends of the molecules in the side opposite to the drive wiring line.

According to a further aspect of the present invention, there is provided a liquid crystal display panel comprising: a pair of substrates disposed facing each other by a gap interposed therebetween; electrodes formed on the pair of substrates on the sides facing each other, the electrodes defining each of a plurality of pixels; and an alignment film formed on the pair of substrates on the sides facing each other, and covering the electrodes, the alignment film including: a first domain for each pixel having a first pre-tilt angle on the side of one substrate and a second pre-tilt angle different from the first pre-tilt angle on the side of the other substrate; a second domain for each pixel having a third pre-tilt angle larger than the first pre-tilt angle on the side of said one substrate and a fourth pre-tilt angle smaller than the second pre-tilt angle on the side of the other substrate; and a third domain for each pixel having a fifth pre-tilt angle smaller than the third pre-tilt angle on the side of the one substrate and a sixth pre-tilt angle smaller than the second pre-tilt angle on the side of the other substrate.

Since the regions having a relatively small pre-tilt angle face each other in the third domain, the reverse twist phenomenon can be suppressed. Even in the first and second domains, the reverse twist phenomenon becomes hard to be generated, due to the influence of the orientation of the liquid crystal molecules in the third domain.

The first and fifth pre-tilt angles may be set equal, and the fourth and sixth pre-tilt angles may be set equal.

The third domain may be disposed at a region not in contact with the end portion of the pixel.

The liquid crystal molecules in the third domain is likely to be influenced by the lateral electric field generated by the drive wiring line. Since the third domain is set remote from the end portion of the pixel, the influence of the lateral electric field can be suppressed.

A plurality of third domains may be disposed for each pixel.

Since the area of each of the third domains can be reduced, the reverse tilt in the third domain can be suppressed.

The surface of the alignment film formed at least one of the pair of substrates on the side facing each other may have a step, and the third domain may be disposed at a lower region near at the step.

The rubbing process becomes likely to be insufficient at the lower region near the step and therefore the reverse twist phenomenon is likely to occur. Since the small pre-tilt regions face each other at the lower region near the step, the reverse twist phenomenon can be suppressed.

DETAILED DESCRIPTION OF THE PREFERRED EMBODIMENTS

A method of manufacturing a liquid crystal display panel according to the first embodiment of the invention will be described with reference to FIGS. 1A to 2B.

Figure 1A:
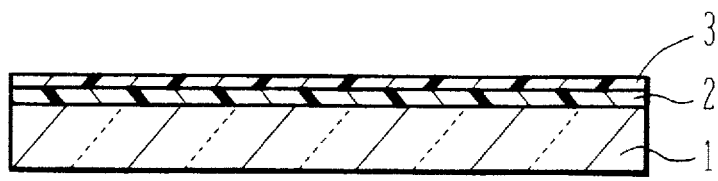
FIGS. 1A, 1B, and 1D are schematic cross sectional diagrams illustrating the manufacture method of a liquid crystal display panel according to a first embodiment of the invention.

As shown in FIG. 1A, on the surface of a transparent substrate 1 such as glass, a lower alignment film 2 and an upper alignment film 3 made of different material as that of the lower alignment film 2 are formed. Although not shown in FIG. 1A, pixel electrodes, thin film transistors (TFTs), and drive wiring lines are formed between the lower alignment film 2 and transparent substrate 1 as will be later described. The upper alignment film 3 imparts a larger pre-tilt angle to liquid crystal molecules than the lower alignment film 2. The pre-tilt angle is an angle between the director of liquid crystal molecules and the substrate surface.

Figure 1B:
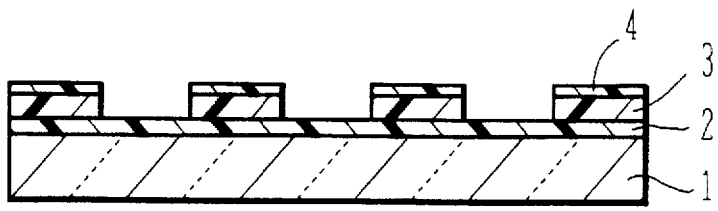

As shown in FIG. 1B, a resist layer is coated on the surface of the upper alignment film 3, and exposed and developed to form a desired resist pattern 4. By using the resist pattern 4 as a mask, the upper alignment film 3 is selectively etched to partially expose the surface of the lower alignment film 2. After this etching, the resist pattern 4 is removed.

Figure 1C:
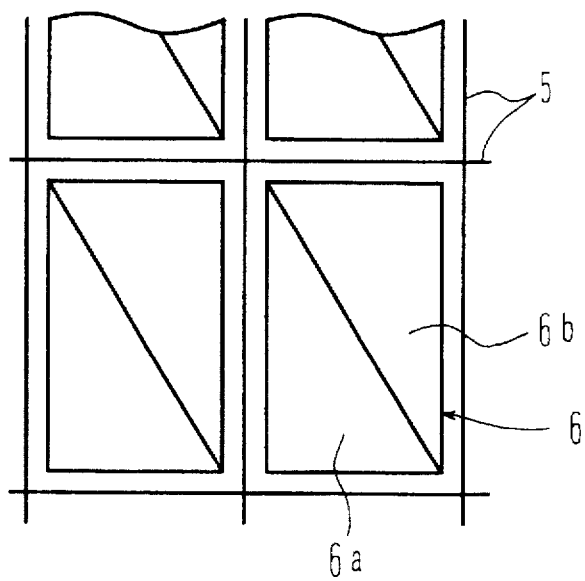
FIG. 1C is a schematic plan view illustrating the manufacture method of a liquid crystal display panel according to the first embodiment of the invention.

FIG. 1C is a schematic plan view of the substrate after removing the resist pattern 4. Drive wiring lines are formed in a lattice pattern, and surrounds and defines a rectangular pixel region 6. As will be later described with FIG. 2A, a TFT is formed near at each corner of the pixel region 6, and the pixel electrode is formed in the pixel region 6 at the area where TFT is not formed.

Each pixel region 6 is divided into two regions by a right side downward diagonal as viewed in FIG. 1C. A lower left region 6a is formed with the upper alignment film 3, and an upper right region 6b is formed with the exposed lower alignment film 2. In other words, a pre-tilt angle is imparted to the lower left region 6a larger than the upper right region 6b. Two regions having different pre-tilt angles from each other are therefore formed in each pixel region 6. In the case wherein two regions having different pre-tilt angles are formed in one pixel region, the region with a larger pre-tilt angle is called a large pre-tilt region and the region with a smaller pre-tilt angle is called a small pre-tilt region, in the following where applicable.

Figure 1D:
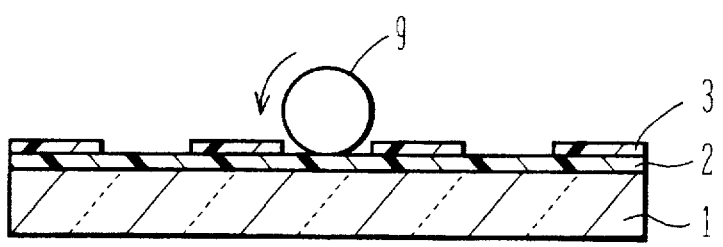

As shown in FIG. 1D, the alignment film surface is rubbed with a rubbing roller 9 during a rubbing process. The rubbing direction is from upper right to lower left as viewed in FIG. 1C. As the rubbing roller 9 passes over the drive wiring lines 5 in this rubbing direction, it always moves from the large pre-tilt region to the adjacent small pre-tilt region.

In the above manner, a substrate with TFTs (TFT substrate) can be prepared. In the similar manner, a substrate with the common electrode (common electrode substrate) is prepared. The common electrode substrate is disposed facing the TFT substrate such that the large and small pre-tilt regions 6a and 6b of the TFT substrate respectively face the small and large pre-tilt regions of the common electrode substrate. The alignment films on the side of the common electrode substrate disposed in the above manner are rubbed so that the easy axis direction on the common electrode substrate side intersects with the easy axis direction on the TFT substrate side, for example, by a right angle.

Figure 2A:
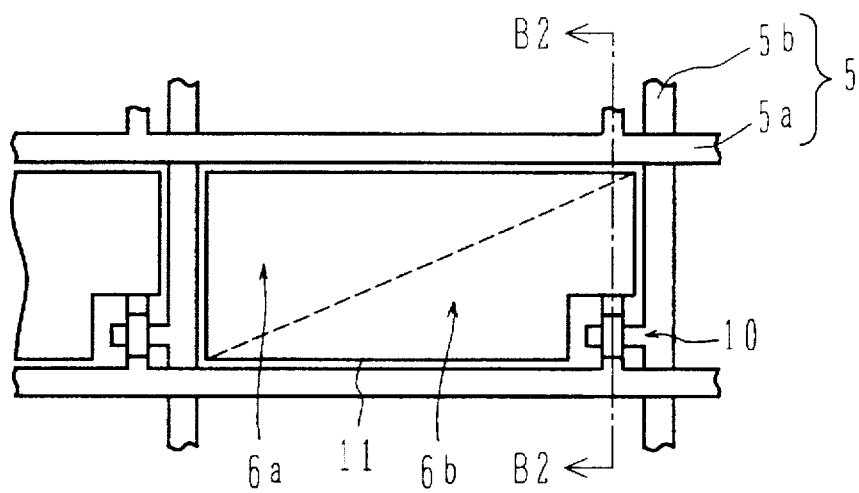
FIGS. 2A and 2B are a plan view of a TFT substrate of the liquid crystal display panel of the first embodiment, and a cross sectional view of the liquid crystal display panel of the first embodiment.

FIG. 2A is a plan view of the TFT substrate manufactured by the method illustrated in FIGS. 1A to 1D. The drive wiring lines 5 are disposed in a lattice pattern. The wiring line extending in the horizontal direction in FIG. 2A is a drain line 5a made of Cr, Al, or the like, and the wiring line extending in the vertical direction is a gate line 5b made of Cr, Al, or the like. In the pixel region surrounded by adjacent two drain lines 5a and two gate lines 5b, a pixel electrode 11 and a TFT 10 are formed. The upper left region in the pixel region is a large pre-tilt region 6a and the lower right region is a small pre-tilt region 6b.

TFT 10 is formed near a cross point of the drain line 5a and gate line 5b. The gate electrode of TFT 10 is connected to the gate line 5b, and the drain region is connected to the drain line 5a. The source region of TFT 10 is connected to a pixel electrode 11 made of indium tin oxide (ITO) or the like.

Figure 2B:
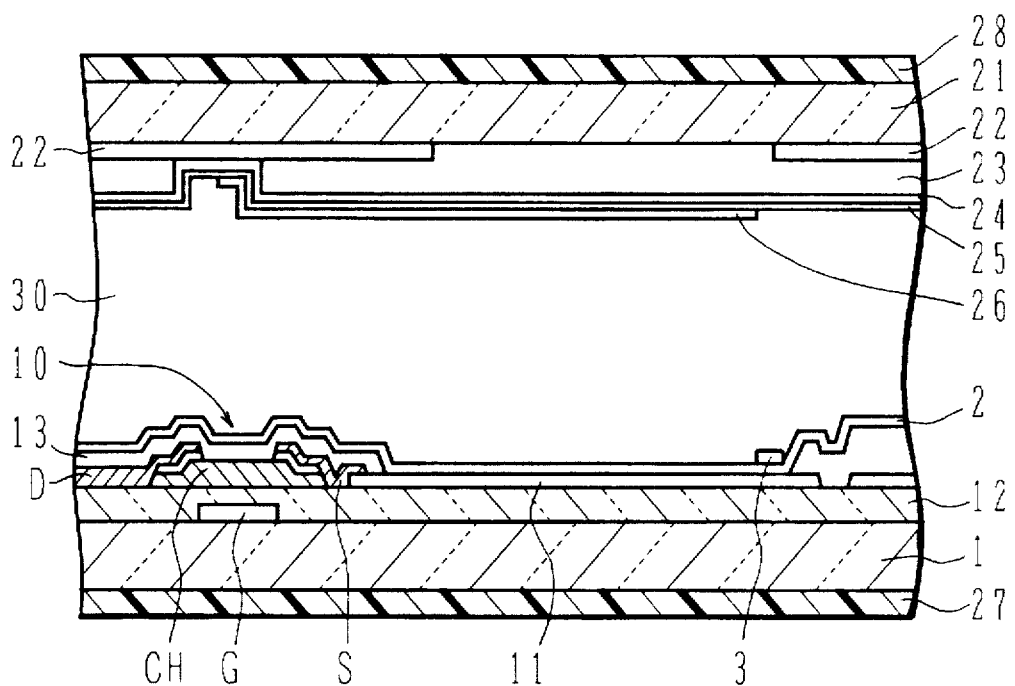

FIG. 2B is a cross sectional view of a liquid crystal display panel taken along a one-dot chain line B2—B2 shown in FIG. 2A. The gate electrode G made of Cr, Al, or the like is formed on the surface of the transparent substrate 1, and a gate insulating layer 12 made of SiN, alumina, or the like is formed covering the gate electrode G. A channel layer CH made of amorphous silicon is formed on the surface of the gate insulating layer 12 over the gate electrode G, and the drain region D and source region S made of Cr, Al, or the like are formed on both sides of the channel layer CH. On the surface of the gate insulating layer 12, the pixel electrode 11 is formed continuously with the source region S.

TFT 10 is covered and protected with a TFT protective layer 13 made of SiN or the like. The lower alignment film 2 is formed covering the TFT protective layer 13 and pixel electrode 11. The upper alignment film 3 is formed partially on the lower alignment film 2 as viewed in FIG. 2B.

The transparent substrate 21 with the common electrode is disposed facing the substrate with the TFTs. Black matrices 22 made of Cr or the like are formed on the surface of the transparent substrate 21 at the regions corresponding to the TFTs 10 and drive wiring lines 5, and color filters 23 are formed on the transparent substrate 21 at the regions corresponding to the pixel electrodes 11. A common electrode 24 is formed over the whole area of the transparent substrate 21, covering the color filters 23 and black matrices 22. A lower alignment film 25 is formed on the common electrode 24.

On the surface of the lower alignment film 25, an upper alignment film 26 having a larger pre-tilt angle than the lower alignment film 25 is formed at the regions corresponding to the small pre-tilt regions of the TFT substrate. Specifically, the small pre-tilt regions of the TFT substrate face the large pre-tilt regions of the common electrode substrate, whereas the large pre-tilt regions of the TFT substrate face the small pre-tilt regions of the common electrode substrate.

A liquid crystal layer 30 is sandwiched between the TFT substrate and common electrode substrate.

Polarizing plates 27 and 28 are disposed on the outer surfaces of the transparent substrates 1 and 21. If the polarizing plates 27 and 28 are disposed with their polarizing axes being set perpendicular, the normally white mode is obtained which shows a white state when a voltage is not applied, and if disposed in parallel, the normally black mode is obtained which shows a black state when a voltage is not applied.

Next, with reference to FIGS. 3A to 3D, the tilt directions of liquid crystal molecules of the liquid crystal display panel manufactured by the embodiment method will be described in comparison with a liquid crystal display panel manufactured by a conventional method.

Figure 3A:
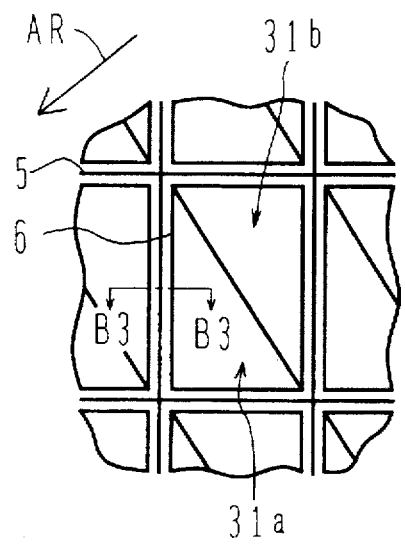
FIG. 3A is a diagram showing an domain pattern of the liquid crystal display panel of the first embodiment of the invention.

FIG. 3A shows an domain pattern of the liquid crystal display panel manufactured by the embodiment method. Each pixel region 6 is defined being surrounded by the drive wiring lines 5. The pixel region 6 is divided into a first domain 31a and a second domain 31b. The first domain 31a has a large pre-tilt region on the TFT substrate side and a small pre-tilt region on the common electrode side, and the second domain 31b has small and large pre-tilt regions at the areas opposite to the first domain 31a. An arrow AR indicates the rubbing direction on the TFT substrate side.

Figure 3B:
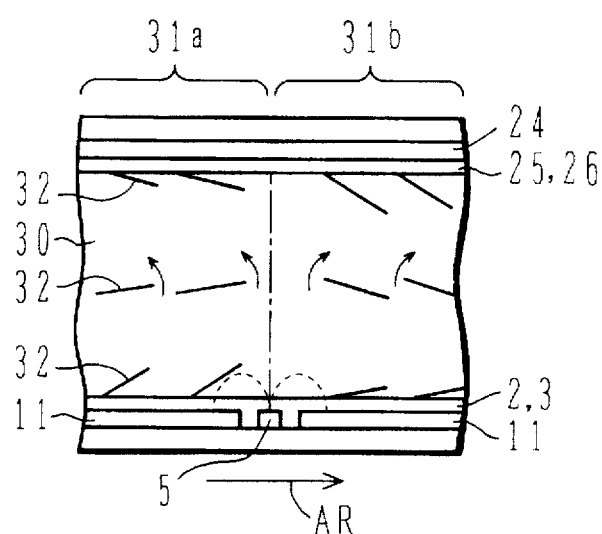
FIG. 3B is a schematic cross sectional view of the liquid crystal display panel of FIG. 3A illustrating tilt directions of liquid crystal molecules.

FIG. 3B is a schematic cross sectional view taken along a one-dot chain line B3—B3 shown in FIG. 3A. Pixel electrodes 11 are disposed on both sides of a drive wiring line 5 on the TFT substrate. The left half of FIG. 3B shows the first domain 31a and the right half shows the second domain 31b. Straight lines 32 in the liquid crystal layer 30 indicates the director of liquid crystal molecules. The alignment film on the TFT substrate side is rubbed from left to right. Therefore, the liquid crystal molecules in contact with the alignment films 2 and 3 pre-tilt raising the right ends as viewed in FIG. 3B.

The easy axes on the sides of the TFT substrate and common electrode substrate are actually perpendicular to each other so that liquid crystal molecules are in a twist orientation. However, in FIG. 3B, the directors of liquid crystal molecules are drawn by considering only tilt without considering twist.

In the first domain 31a, since the pre-tilt angle on the TFT substrate side is large, as an electric field is applied to the liquid crystal layer 30, the liquid crystal molecules tilt in the counter clockwise direction as indicated by arrows in FIG. 3B. On the other hand, in the second domain 31b, the liquid crystal molecules tilt in the clockwise direction.

If there is a potential difference between the drive wiring line 5 and pixel electrode 11, an electric field in the lateral direction is generated having lines of electric force indicated by broken lines in FIG. 3B. The lateral electric field is generated having electric field components not in the thickness direction of the liquid crystal layer 30, but in the substrate in-plane direction (lateral direction). Liquid crystal molecules near the ends of the pixel electrode 11 tend to be oriented along the lines of electric force. Specifically, the liquid crystal molecules near the ends of the pixel electrode 11 tend to raise their ends near the drive wiring line 5 in the direction of moving away from the drive wiring line 5. This direction is the same as the direction of liquid crystal molecules tilted when an electric field is applied to the liquid crystal layer 30.

Figure 3C:
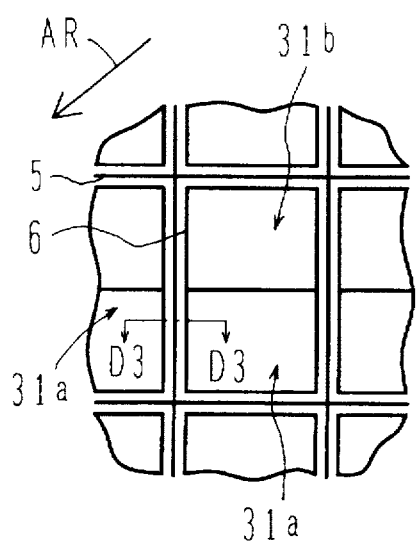
FIG. 3C is a diagram showing an domain pattern of a conventional liquid crystal display panel.

FIG. 3C shows a domain pattern of a liquid crystal display panel manufactured by a conventional method. A lower half of FIG. 3C shows the first domain 31a and an upper half shows the second domain 31b. An arrow AR in FIG. 3C indicates the rubbing direction on the TFT substrate side.

Figure 3D:
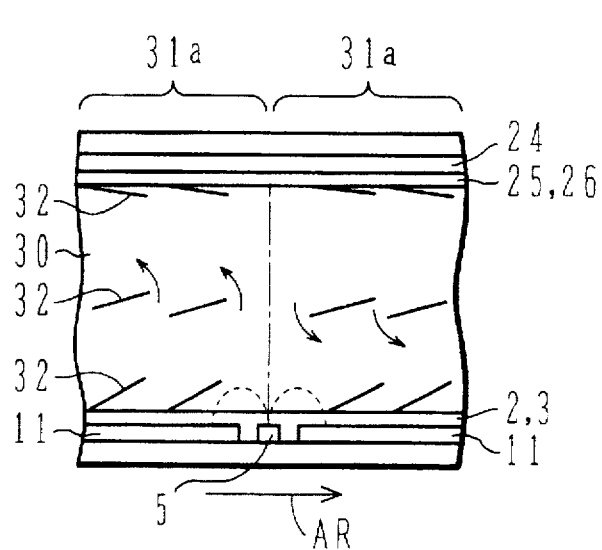
FIG. 3D is a schematic cross sectional view of the liquid crystal display panel of FIG. 3C illustrating tilt directions of liquid crystal molecules.

FIG. 3D is a schematic cross sectional view taken along a one-dot chain line D3—D3 shown in FIG. 3C. Since both the left and right halves of FIG. 3D show the first domains 31a, a large pre-tilt region is on the TFT substrate side, and a small pre-tilt region is on the common electrode substrate side. The rubbing direction of the alignment films on the TFT substrate side is from left to right as viewed in FIG. 3D.

As an electric field is applied to the liquid crystal layer 30, the liquid crystal molecules in the regions at the right and left halves in FIG. 3D tilt in the counter clockwise direction. This tilt direction coincides, in the left half region, with the tilt direction caused by the lateral electric field generated near at the drive wiring line 5, but does not coincide in the right half region. Accordingly, the tilt direction of liquid crystal molecules near at the end of the pixel region in the right half region becomes unstable, and a tilt direction opposite to a desired direction may occur.

As shown in FIG. 3C, if each pixel region 6 is divided into domains by a straight line interconnecting the centers of opposing sides of the rectangle of the pixel region 6, in one of the two domains on both sides of the drive wiring line 5, the tilt direction caused by the electric field having lateral components does not coincide with a desired tilt direction.

In contrast, in this embodiment as shown in FIG. 3A, each pixel region 6 is divided into domains by a diagonal, and the rubbing direction is selected so that the rubbing roller moves from a large pre-tilt region to a small pre-tilt region when it passes over the drive wiring line 5. Since the domains are disposed in the above manner and the rubbing direction is selected in the above manner, the tilt direction to be caused by the lateral electric field and the desired tilt direction can be made coincide with each other on both sides of the drive wiring line 5.

Figure 4A:
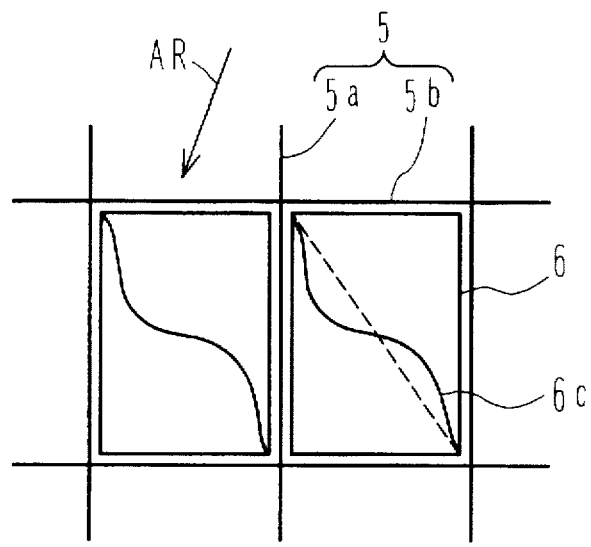
FIGS. 4A and 4B are diagrams showing domain patterns of a liquid crystal display panel according to modifications of the first embodiment of the invention.

FIG. 4A illustrates a domain division method according to a modification of the first embodiment. Drain lines 5a and gate lines 5b are disposed in a lattice pattern to define pixel regions 6. An angle between the rubbing direction AR and the drain line 5a is smaller than an angle between the rubbing direction AR and the gate line 5b. A boundary line 6c between domains is between the diagonal (indicated by a broken line) and the drain line 5a near at the corners of the pixel region 6.

The easy axis is in parallel with the rubbing direction AR. Liquid crystal molecules near the edge of the pixel region are influenced more by the lateral electric field generated by the drive wiring line 5, the more the lateral electric field is in parallel with the director of liquid crystal molecules. In the example shown in FIG. 4A, the influence by the lateral electric field generated by the drain line 5a is less than the influence by the lateral electric field generated by the gate line 5b.

Liquid crystal molecules near the boundary line 6c between domains are likely to have an unstable tilt direction when an electric field is applied. Therefore, the liquid crystal molecules near the boundary line 6c are greatly influenced by the lateral electric field. A strong influence by the lateral electric field generated by the gate line 5b upon liquid crystal molecules near the boundary line 6c can be avoided by setting the boundary line 6c away from the gate line 5b as shown in FIG. 4A.

Figure 4B:
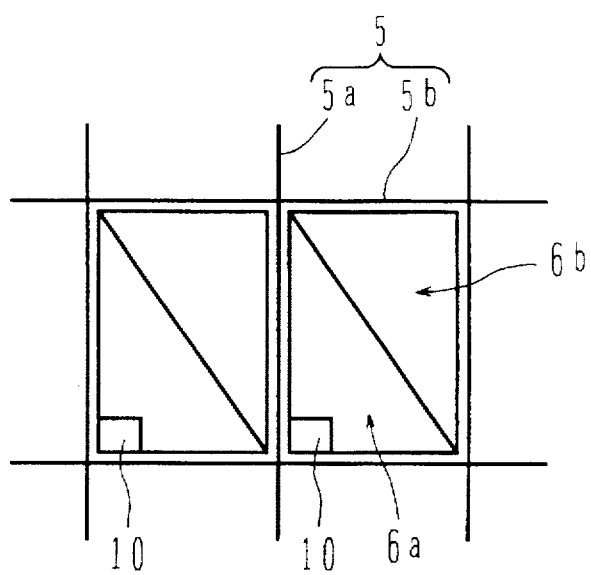

FIG. 4B shows the positional relationship between domains and TFTs. A TFT 10 is placed in a large pre-tilt region. This arrangement can mitigate an unstable tilt direction of liquid crystal molecules to be caused by disturbance of an electric field near at TFT 10.

Liquid crystal molecules on the boundary line between domains are influenced by the orientations of liquid crystal molecules on both sides of the boundary line when an electric field is applied to the liquid crystal layer. If the tilt directions of liquid crystal molecules on both sides of the boundary line are opposite, the liquid crystal molecules close to the boundary line do not rise or tilt even if an electric field is applied, and maintain the orientation state generally the same as when the electric field is not applied. Therefore, in the case of a liquid crystal display panel of the normally black mode type, the boundary line is drawn in black in the white image area.

In contrast, in the case of a liquid crystal display panel of the normally white mode type, the boundary line is drawn in white in the black image area. In order to make black the whole black image area on the screen, it is necessary to form a light shielding film on the boundary region. It is not necessary for the normally black mode to form a light shielding film.

Next, the second embodiment of the invention will be described with reference to FIGS. 5A to 5D showing domain patterns of pixel regions.

Figure 5A:
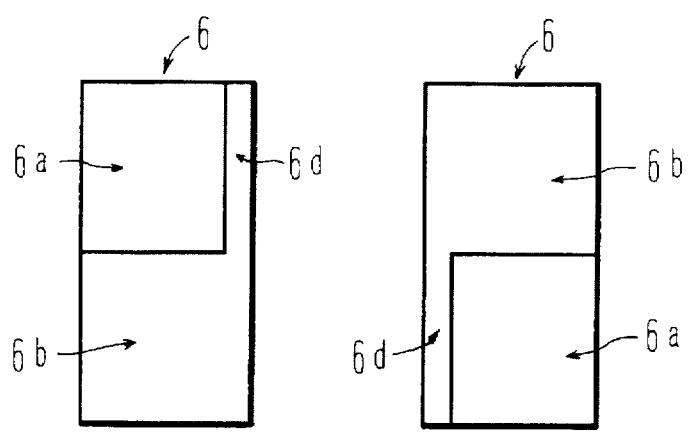
FIGS. 5A to 5D are diagrams showing domain patterns of a liquid crystal display panel according to a second embodiment of the invention.

The left diagram in FIG. 5A shows a domain pattern in the pixel region 6 on the TFT substrate side, and the right diagram shows a domain pattern in the pixel region 6 on the common electrode substrate side. The large pre-tilt domain 6a on the TFT substrate side is formed in the upper half of the pixel region excepting a right side peripheral domain 6d, and the small pre-tilt domain 6b is formed in the lower half and in the right side peripheral domain 6d. The large pre-tilt domain 6a on the common electrode substrate side is formed in the lower half of the pixel domain excepting a left side peripheral region 6d, and the small pre-tilt domain 6b is formed in the upper half and in the left side peripheral domain 6d. As the two substrates are disposed facing each other, the small pre-tilt domains face each other at the right side peripheral domain 6d in the upper half of the pixel domain and at the left side peripheral domain 6d in the lower half.

If a panel of a domain division type is given a large pre-tilt angle, the liquid crystal molecules having the large pre-tilt angle have a large elastic energy, leading to a high possibility of the reverse twist phenomenon with a twist direction of liquid crystal molecules opposite to a desired one. If the small pre-tilt domain are faced each other as shown in FIG. 5A, the reverse twist phenomenon becomes hard to occur at this facing domain. Also the liquid crystal molecules adjacent to this domain are influenced by the orientations of the liquid crystal molecules in the facing domain and the desired twist direction becomes likely to be generated. In this manner, by providing the domain where the small pre-tilt domains face each other, the reverse twist phenomenon can be suppressed.

Figure 5B:
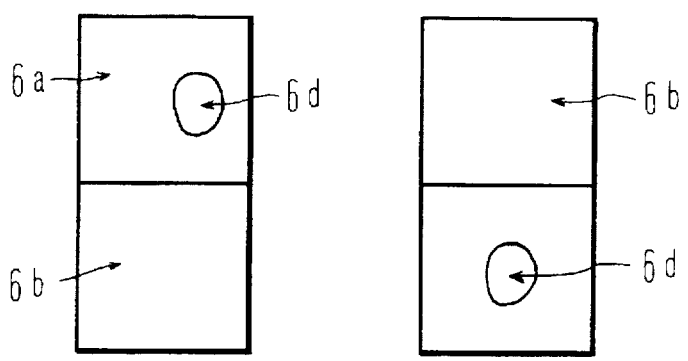

As shown in FIG. 5B, a domain 6d where the small pre-tilt domains face each other may be formed in the large pre-tilt domain 6a. With this arrangement, the domain where the small pre-tilt domains face each other can be set remote from the drive wiring lines. The liquid crystal molecules at the small pre-tilt facing domain have no definite pre-tilt direction when a voltage is applied so that they are easily influenced by the lateral electric field generated by the drive wiring lines. The arrangement shown in FIG. 5B can suppress the influence of the lateral electric field upon the liquid crystal molecules at the small pre-tilt facing domain.

Figure 5C:
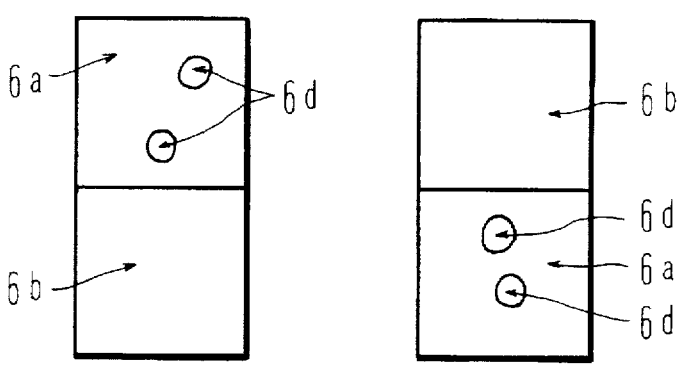

As shown in FIG. 5C, a plurality of small pre-tilt facing domain 6d may be formed in the large pre-tilt domain 6a. With this arrangement, the area of each domain 6d can be reduced. If the small pre-tilt facing domain is too large, the tilt directions of the liquid crystal molecules in this domain become unstable. By reducing the area of each domain 6d, a stable tilt direction can be attained even in the small pre-tilt facing domain.

Figure 5D:
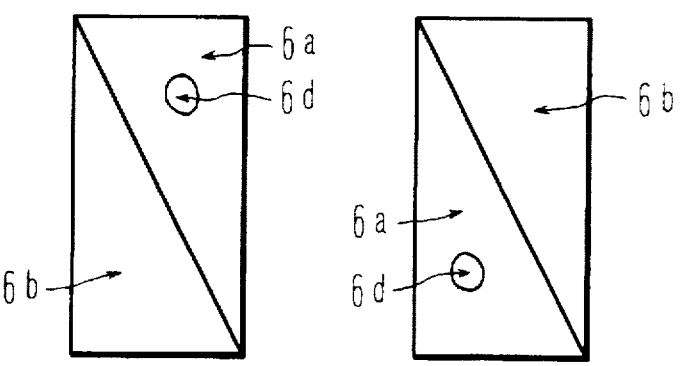

As shown in FIG. 5D, a boundary line between the large pre-tilt domain 6a and small pre-tilt domain 6b may be set along the diagonal of the pixel region such as shown in FIG. 1C. In this case, it is preferable that the small pre-tilt facing domain 6d is formed in the large pre-tilt domain 6a similar to FIG. 5B. Similar to FIG. 5C, a plurality of small pre-tilt facing domains may be formed in the large pre-tilt domain 6a.

Next, with reference to FIG. 6, a modification of the second embodiment will be described.

Figure 6:
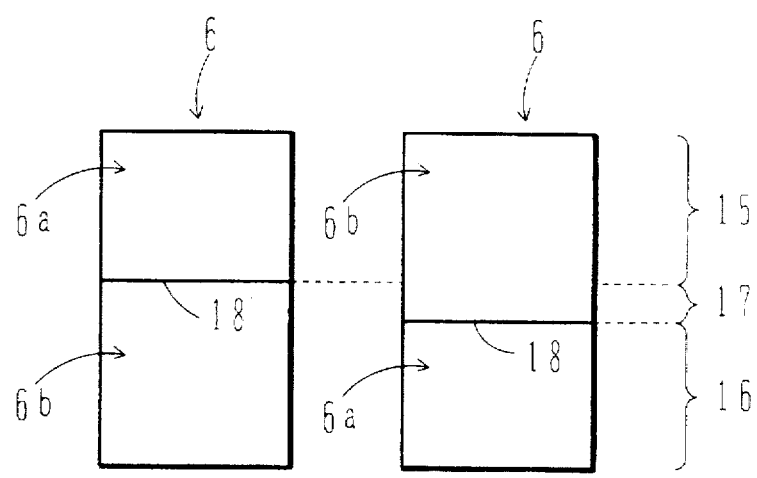
FIG. 6 is a diagram showing an domain pattern of a liquid crystal display panel according to a modification of the second embodiment of the invention.

The left diagram in FIG. 6 shows an domain pattern in the pixel region 6 on the TFT substrate side, and the right diagram shows an domain pattern on the common electrode substrate side. The pixel region 6 is divided by a boundary line 18 into a large pre-tilt domain 6a and a small pre-tilt domain 6b. The large pre-tilt domain 6a of one substrate mainly faces the small pre-tilt domain 6b of the other substrate. The position of the boundary line 18 of one substrate is shifted toward the large pre-tilt domain 6a from the position of the boundary line 18 of the other substrate.

As the two substrates face each other, the pixel region 6 is partitioned into a first domain 15, a second domain 16, and a third stripe domain 17 between the first and second domains 15 and 16. In the first and second domains 15 and 16, the large pre-tilt domain 6a faces the small pre-tilt domain 6b, and in the third domain 17, the small pre-tilt domains 6b face each other.

Similar to the second embodiment described with FIGS. 5A to 5D, in the domain 17 where the small pre-tilt domains 6b face each other, the reverse twist phenomenon is suppressed and it is also suppressed in the whole area of the pixel region.

Assuming that the vertical length of the pixel region 6 is about 200 μm, the width of the third domain 17 is preferably set to about 2 to 40 μm. The position alignment error when the two substrates are bonded is generally about 3 μm. Therefore, the shift amount of the boundary line 18 of one substrate from the position corresponding to the boundary line of the other substrate is preferably set to about 5 to 40 μm.

In order to enhance the effect of suppressing the reverse twist phenomenon, it is preferable to set the width of the third domain 17 to 5 μm or wider, i.e., to set the shift amount between the boundary lines 18 of the two substrates to 8 μm or larger. In order to avoid an unstable tilt direction in the third domain 17, it is preferable to set the width of the third domain to 25 μm or narrower.

The pattern of the large pre-tilt domain 6a and small pre-tilt domain 6b shown in FIG. 6 is formed by the similar method to that described with FIGS. 1A to 1D. As in the case where an exposure mask for forming the resist pattern shown in FIG. 1B is aligned in position, an exposure mask is shifted in the vertical direction in FIG. 6 to change the width of the third domain 17. In this manner, the width of the third domain 17 can be set to various values by using one exposure mask pattern, in the case of an domain pattern wherein the first and second domains 15 and 16 are disposed between the third strip domain 17 with the small pre-tilt domains 6b being faced each other.

If the exposure mask is shifted too large, the large pre-tilt domains 6a may be faced each other at the boundary region between adjacent pixel regions. If the large pre-tilt domains 6a are faced each other, the twist direction of liquid crystal molecules becomes unstable. In order to prevent the large pre-tilt domains 6a from being faced each other, it is preferable to form the small pre-tilt domain at the boundary region between adjacent pixel regions.

The width of the third domain 17 may be changed by finely adjusting the position alignment when the TFT substrate and common electrode substrate are bonded together.

Figure 7A:
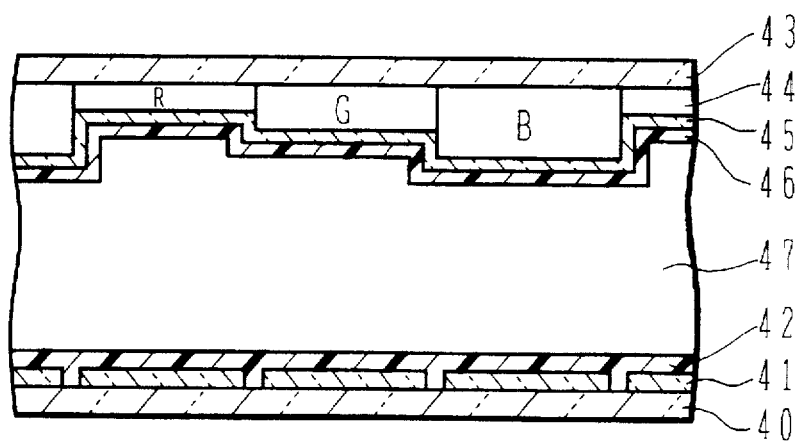
FIGS. 7A and 7B are a cross sectional view of a multi-gap color liquid crystal display panel and a diagram showing a domain pattern, according to the second embodiment of the invention.

FIG. 7A is a schematic cross sectional view of a multi-gap color liquid crystal display panel.

On the substrate of a transparent substrate 40, pixel electrodes 41 are formed. TFTs and drive wiring lines are not drawn in FIG. 7A. An alignment film 42 is formed over the whole surface of the substrate, covering the pixel electrodes 41. On the surface of a transparent substrate 43, color filters 44 are disposed. A common electrode 45 and alignment film 46 are laminated covering the color filters 44. The transparent substrates 40 and 43 are disposed with the alignment films being faced each other, and a liquid crystal layer 47 is sandwiched therebetween.

The thicknesses of color filters 44 are larger in the order of a red pixel, a green pixel, and a blue pixel. Therefore, the surface of the alignment film 46 is irregular in conformity with the steps on the surface of the color filters 44. As the alignment film 46 is rubbed, an anchoring force is imparted to liquid crystal molecules. This force tends to become insufficient at the lower region near at each step.

Specifically, the anchoring force is likely to become insufficient, near at the end portion of the green pixel on the blue pixel side, at the end portions of the red pixel on the green and blue pixel sides. The thicker the liquid crystal, layer 47, the weaker the anchoring force for liquid crystal molecules becomes and the more likely the reverse twist phenomenon occurs.

Figure 7B:
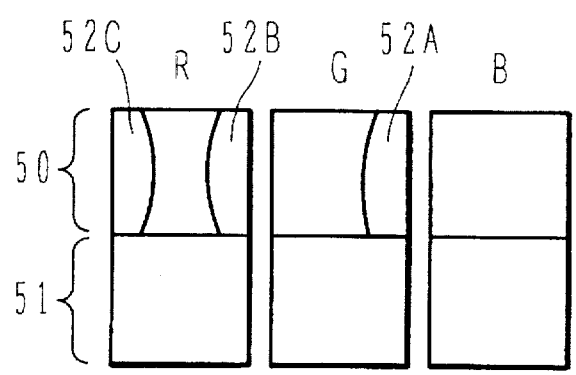

FIG. 7B shows the domain pattern of red, green, and blue pixels.

The upper half of each pixel is a first domain 50 where the large pre-tilt region on the TFT substrate side faces the small pre-tilt region on the common electrode side, and the lower half is a second domain 51 having large and small pre-tilt regions disposed oppositely to the first domain 50.

In the lower surface area of the alignment film having steps thereon, the region near the steps is shaded when being rubbed. Therefore, the region is likely to have larger pre-tilt angles than the region far from the steps. For example, liquid crystal molecules are likely to have substantialy large pre-tilt angles, near at the end portion 52A of the small pre-tilt region in the green pixel on the blue pixel side, at the end portion 52B of the small pre-tilt region in the red pixel on the green pixel side, and at the end portion 52C of the small pre-tilt region in the red pixel on the blue pixel side. Therefore, at these portions, the large pre-tilt regions face each other and the reverse twist is likely to be generated. By forming the small pre-tilt regions at the regions on the TFT substrate side corresponding to the end portions 52A to 52C, the reverse twist phenomenon can be suppressed.

The above advantageous effects of the second embodiment can be expected not only for TFT type liquid crystal display panels but also for simple matrix type liquid crystal display panels.

The domain patterns of the first embodiment may be applied to a liquid crystal display panel using multi-gap color filters.

Figure 8:
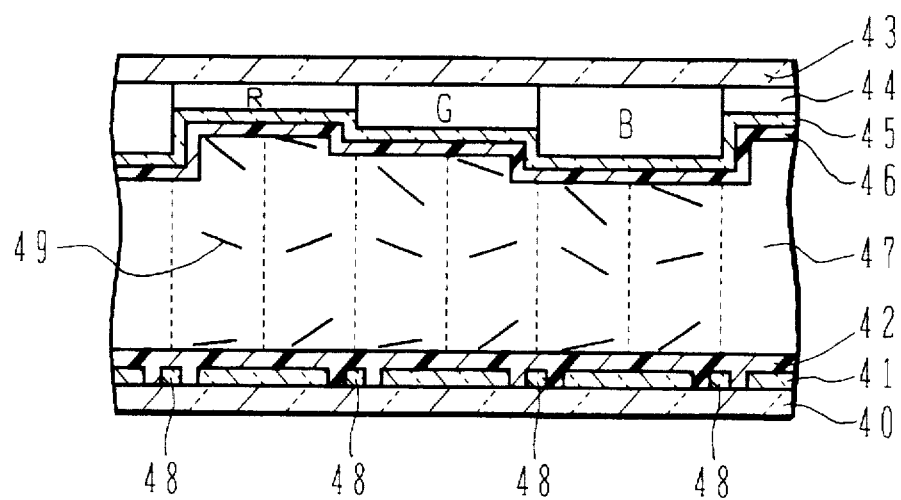
FIG. 8 is a cross sectional view of a multi-gap color liquid crystal display panel which incorporates the first embodiment of the invention.

FIG. 8 is a cross sectional view of a multi-gap color liquid crystal display panel incorporating the first embodiment. On the surface of a transparent substrate 40, pixel electrodes 41 and drive wiring lines 48 are formed. TFTs are not drawn in FIG. 8. An alignment film 42 is formed over the whole surface of the substrate, covering the pixel electrodes 41 and drive wiring lines 48. On the surface of a transparent substrate 43, color filters 44 are disposed. A common electrode 45 and alignment film 46 are laminated covering the color filters 44. The transparent substrates 40 and 43 are disposed with the alignment films being faced each other, and a liquid crystal layer 47 is sandwiched therebetween.

The thicknesses of color filters 44 are larger in the order of a red pixel, a green pixel, and a blue pixel. Therefore, the surface of the alignment film 46 is irregular in conformity with the steps on the surface of the color filters 44.

Each pixel region is divided into two domains of large pre-tilt and small pre-tilt. A short straight line 49 in the liquid crystal layer 47 indicates the director of each liquid crystal molecule when no voltage is applied. Each domain is arranged similar to the case of FIG. 3B so that the central liquid crystal molecules of the liquid crystal layer 47 tilt moving the ends of the liquid crystal molecules on the side of the drive wiring lines away from the drive wiring lines near at the end portion of the pixel region when a voltage is applied.

There is a tendency that the anchoring force of the alignment film on the multi-gap color filter becomes insufficient because of the irregular surface of the alignment film and the reverse tilt phenomenon is likely to occur. By applying the domain pattern of the first embodiment to the multi-gap color liquid crystal display panel, it can be expected that the reverse tilt phenomenon can be suppressed.

The present invention has been described in connection with the preferred embodiments. The invention is not limited only to the above embodiments. It is apparent to those skilled in the art that various modifications, improvements, combinations and the like can be made without departing from the scope of the appended claims.

We claim:

1. A liquid crystal display panel comprising:
a pair of substrates disposed facing each other by a gap interposed therebetween;
electrodes formed on said pair of substrates on the sides facing each other, said electrodes each defining one of a plurality of pixels; and
an alignment film formed on each of said pair of substrates on the sides facing each other, and covering each of said electrodes, said alignment films including: a first domain for each pixel having a first pre-tilt angle on the side of one substrate and a second pre-tilt angle different from said first pre-tilt angle on the side of the other substrate; a second domain for each pixel having a third pre-tilt angle larger than said first pre-tilt angle on the side of said one substrate and a fourth pre-tilt angle smaller than said second pre-tilt angle on the side of the other substrate; and a third domain for each pixel having a fifth pre-tilt angle smaller than said third pre-tilt angle on the side of said one substrate and a sixth pre-tilt angle smaller than said second pre-tilt angle on the side of the other substrate.

2. A liquid crystal display panel according to claim 1, wherein said first and fifth pre-tilt angles are equal, and said fourth and sixth pre-tilt angles are equal.

3. A liquid crystal display panel according to claim 1, wherein each said third domain is disposed at a region not in contact with the end portion of its respective.

4. A liquid crystal display panel according to claim 1, wherein a plurality of third domains are disposed for each pixel.

5. A liquid crystal display panel according to claim 1, wherein for each pixel the surface of said alignment film formed on at least one of said pair of substrates on the side facing the other has a step, and said third domain is disposed at a lower region near said step.

6. A liquid crystal display panel according to claim 1, wherein each said third domain is a stripe region sandwiched between said first and second domains of its respective pixel.

7. A liquid crystal display panel according to claim 6, wherein the width of each said third domain is 2 to 40 μm.

8. A liquid crystal display panel according to claim 6, wherein one of said alignment films gives, at a boundary region between adjacent pixels, a pre-tilt angle which is equal to said fifth pre-tilt angle on the side of said one substrate and the other alignment film gives a pre-tilt angle which is equal to said sixth pre-tilt angle on the side of the other substrate.

9. A liquid crystal display panel comprising:
first and second substrates disposed facing each other with a gap interposed therebetween;
drive wiring lines formed on said first substrate on the side facing said second substrate, said drive wiring lines including a plurality of signal lines disposed in a stripe shape and a plurality of control lines disposed in a stripe shape and crossing said signal lines, said drive wiring lines defining a plurality of pixel regions each defined by two adjacent signal lines and two adjacent control lines;
a pixel electrode formed on said first substrate in each said pixel region and on the side facing said second substrate;
a switching element formed for each said pixel electrode, said switching element interconnecting the corresponding pixel electrode and one of said adjacent two signal lines and being controlled by one of said adjacent two control lines;
a common electrode formed on said second substrate on the side facing said first substrate;
a liquid crystal layer sandwiched between said first and second substrates; and an alignment film formed on each of said first and second substrates on the side facing the other substrate, said alignment films giving liquid crystal molecules a pre-tilt so that the liquid crystal molecules at the central region in the depth direction of said liquid crystal layer tilt, moving the ends of the liquid crystal molecules on the side of the closest of said drive wiring lines away from said drive wiring lines when a voltage is applied between each said pixel electrode and said common electrode;

said alignment films including a first substrate side alignment film formed on said first substrate on the side facing said second substrate and a second substrate side alignment film formed on said second substrate on the side facing said first substrate;

each of said pixel regions of said first and second substrate side alignment films being divided at least into first and second domains, said first and second domains of one pixel region being respectively juxtaposed with the second and first domains, respectively, of other pixel regions adjacent to said one pixel region;

said first substrate side alignment film giving the liquid crystal molecules in each first domain a first pre-tilt angle raising the ends of the liquid crystal molecules nearest said drive wiring lines adjacent to said first domain, and giving the liquid crystal molecules in each said second domain a second pre-tilt angle raising the ends of the liquid crystal molecules furthest from said drive wiring lines adjacent to said second domain, said second pre-tilt angle being smaller than said first pre-tilt angle; and said second substrate side alignment film giving the liquid crystal molecules in each said first domain a third pre-tilt angle smaller than said first pre-tilt angle, and giving the liquid crystal molecules in each said second domain a fourth pre-tilt angle larger than said second pre-tilt angle for raising the ends of the liquid crystal molecules on the side furthest from said drive wiring lines adjacent to said first domains;

wherein a boundary line between said first and second domains in each said pixel region is set along one diagonal of said pixel region.

10. A liquid crystal display panel according to claim 9, wherein said switching element is disposed in said first domain.

11. A liquid crystal display panel comprising:

first and second substrates disposed facing each other with a gap interposed therebetween;

drive wiring lines formed on said first substrate on the side facing said second substrate, said drive wiring lines including a plurality of signal lines disposed in a stripe shape and a plurality of control lines disposed in a stripe shape and crossing said signal lines, said drive wiring lines defining a plurality of pixel regions each defined by two adjacent signal lines and two adjacent control lines;

a pixel electrode formed on said first substrate in each said pixel region and on the side facing said second substrate;

a switching element formed for each said pixel electrode, said switching element interconnecting the corresponding pixel electrode and one of said adjacent two signal lines and being controlled by one of said adjacent two control lines;

a common electrode formed on said second substrate on the side facing said first substrate;

a liquid crystal layer sandwiched between said first and second substrates; and an alignment film formed on each of said first and second substrates on the side facing the other substrate, said alignment films giving liquid crystal molecules a pre-tilt so that the liquid crystal molecules at the central region in the depth direction of said liquid crystal layer tilt, moving the ends of the liquid crystal molecules on the side of the closest of said drive wiring lines away from said drive wiring lines when a voltage is applied between each said pixel electrode and said common electrode;

said alignment films including a first substrate side alignment film formed on said first substrate on the side facing said second substrate and a second substrate side alignment film formed on said second substrate on the side facing said first substrate;

each of said pixel regions of said first and second substrate side alignment films being divided at least into first and second domains, said first and second domains of one pixel region being respectively juxtaposed with the second and first domains, respectively, of other pixel regions adjacent to said one pixel region;

said first substrate side alignment film giving the liquid crystal molecules in each first domain a first pre-tilt angle raising the ends of the liquid crystal molecules nearest said drive wiring lines adjacent to said first domain, and giving the liquid crystal molecules in each said second domain a second pre-tilt angle raising the ends of the liquid crystal molecules furthest from said drive wiring lines adjacent to said second domain, said second pre-tilt angle being smaller than said first pre-tilt angle; and said second substrate side alignment film giving the liquid crystal molecules in each said first domain a third pre-tilt angle smaller than said first pre-tilt angle, and giving the liquid crystal molecules in each said second domain a fourth pre-tilt angle larger than said second pre-tilt angle for raising the ends of the liquid crystal molecules on the side furthest from said drive wiring lines adjacent to said first domain;

wherein the easy axis directions of said first and second domains of each said pixel regions are the same, and a boundary line between said first and second domains is a curve interconnecting two opposing corners of each said pixel region, said curve near said two opposing corners being disposed between a diagonal interconnecting the two opposing corners and one of two drive wiring lines crossing at said two opposing corners and having a smaller angle relative to the easy axis direction.

12. A liquid crystal display panel according to claim 11, wherein said switching element is disposed in said first domain.

* * * * *